United States Patent [19]

Glas

[11] 4,418,091
[45] Nov. 29, 1983

[54] PROCESS FOR PREPARING A DRY, POWDERY MILK PRODUCT

[75] Inventor: Cor Glas, Tietjerk, Netherlands

[73] Assignee: Centrale Veevoederfabriek "Sloten", Leeuwarden, Netherlands

[21] Appl. No.: 408,570

[22] Filed: Aug. 16, 1982

Related U.S. Application Data

[63] Continuation of Ser. No. 196,429, Oct. 14, 1980, abandoned.

[30] Foreign Application Priority Data

Oct. 17, 1979 [NL] Netherlands .......................... 7907654

[51] Int. Cl.$^3$ .......................... A23C 9/16; A23C 21/06
[52] U.S. Cl. ......................................... 426/580; 426/2; 426/585; 426/588; 426/583
[58] Field of Search ............... 426/583, 588, 585, 587, 426/2, 580, 801

[56] References Cited

U.S. PATENT DOCUMENTS 3,522,054  7/1970  Cavroy et al. ...................... 426/588
3,810,765  5/1974  Nagasawa et al. .................. 426/588

FOREIGN PATENT DOCUMENTS 630063  10/1961  Canada .................................. 426/588
7806635  12/1978  Netherlands .

*Primary Examiner*—Raymond N. Jones
*Assistant Examiner*—George C. Yeung
*Attorney, Agent, or Firm*—Beveridge, DeGrandi & Kline

[57] ABSTRACT

The invention relates to a process for preparing a dry, powdery milk product comprising one or a number of whey products, homogenized fat and at least one caboxylic acid that is soluble in water or in a cold aqueous product, there being no fat separated from the resultant solution after a few days, by homogenizing a fat in a milk liquid, drying the resultant liquid mixture and mixing the resultant dried mixture while forming an end product, at least 25% of the protein in the end product being derived from whey and from product derived from whey, the fat content of the end product is up to 17.5% by weight and at least 0.05% by weight of lecithin, based on the end product, being added. Further, the invention is directed to a process for preparing a liquid milk product by dissolving such a dry powdery milk product in cold water or a cold aqueous product and to a process for feeding mammals with such a liquid milk product.

6 Claims, No Drawings

PROCESS FOR PREPARING A DRY, POWDERY MILK PRODUCT

This is a continuation of application Ser. No. 196,429, filed Oct. 14, 1980 and now abandoned.

The invention is related to a process for preparing a dry, powdery milk product containing one or a number of whey products, homogenized fat, up to 10% by weight of one or a number of saturated or unsaturated mono-, di-, or tri-carboxylic acids and/or hydroxycarboxylic acids having up to 6 carbon atoms and/or salts thereof by homogenizing one or a number of fats in a milk liquid, drying the resultant liquid mixture and mixing the resultant dry mixture further to form an end product, respectively a liquid milk product which is obtained by dissolving this dry, powdery milk product.

Previously, milk having a low temperature (<25° C.) was given ad libitum to calves, for example, according to the so-called "cold feeding system" by means of the "bar system," for example, which consists of a milk-tube filled with milk, which tube is placed out of reach of the calves, and one or a number of narrow tubes, one end of which is situated in the tube and the other end, which is provided with a teat or nipple, is situated within reach of the calves. In able to function well, the milk to be administered should be a stable solution and should remain stable for preferably a number of days, that is a bottom-, middle- or upper layer may not be formed herein, while it should, moreover, be able to flow easily through the narrow tube, and a back pressure valve in the teat, and thus may not be too viscous or contain large lumps. Moreover, for a few days no contaminating flora should develop in the milk, while the flora in the gastric and intestinal tract should preferably, be favorably influenced (reduction or Colis and Salmonellas in the "porte d'entree" of the intestines), which is very important because this reduces the chances of illness.

The above objectives were realized by using the acidified liquid milk product obtained according to the cited Dutch patent application No. 7,806,635, which product is a substitute for the milk which is usually fed to young mammals, particularly calves, lambs and goats. The use of these prepared milk products has, further, a number of advantages above the separate addition of acids to the liquid milk product, since the latter involves extra work, is less accurate and often leads to instable milk. This very acidic milk product which has been used until now should, however, always be dissolved in warm water first (35°–76° C.), which warm solution should then be allowed to cool down to the ambient temperature. This also has a number of disadvantages, however. In practice, it is found to be inconvenient to have to wait until cooling has taken place, especially if there is not enough storage capacity for the milk.

Furthermore, irregular consumption or excessive consumption per time are often the result of the provision of insufficient cooled milk. This means that on some farms the daily consumption is too large, while it is furthermore, a waste of energy to first prepare a warm solution and to then allow this warm solution to cool down.

If, therefore, the breeding powder described could immediately be dissolved in cold water or an aqueous product, which solution will usually have a lower temperature than the ambient temperature, said disadvantages would be removed and a definite advance would have been made in technology. The latter will be of particular importance in areas where there are no heating facilities available (developing countries), or where these facilities are present at a great distance from the live-stock, or in those places where there is a shortage of energy as a result of an extension of the live-stock and mechanization.

Now, the known processes for making milk powders soluble in cold water or an aqueous product (instant), such as the agglomeration of milk powder, in which lecithin is, or is not applied to the powder particles, are considered to be too expensive. The powdery milk product that is to be used does not need to be "instant" for this purpose, but it is necessary that it can be mixed well with cold water or an aqueous product to form a solution which is stable for a few days. If one were to try to directly dissolve the above-mentioned acidic whey products, such as, for example, are described in the above Dutch patent application No. 7,806,635, in cold water or an aqueous product, solid fat is separated which will then float upon the liquid.

An attempt has been made to achieve the said aim by finely dividing fat, through homogenization, into the "milk liquid" and then drying this mixture by atomizing. Here it is customary to homogenize the fat in just a part of the milk liquid that is required for the end product, to dry this mixture by atomizing and to then mix the resultant powder, which is usually indicated by "fatty core," in a dry state with the remaining "milk components" (which are brought separately into powdered form or are introduced as powdered basic material from elsewhere), the acids and any other components, to form a product having the desired end composition. The advantage of the use of a "fatty core" as intermediate product is that only part of the milk liquid needs to be subjected to the homogenizing process, as a result of which the dimensions and the energy usage of the homogenizer can be economized on. Another advantage is that when using powdery starting materials, such as whey powder and low fat milk powder, only part of them have to be dissolved to milk liquid to be re-dried after homogenizing the fat herein. The amount of material to be dried is greatly reduced as a result. It is evident that these advantages become more clear, in proportion as the "fatty core" has a higher fat content. In general, however, it will not be desirable to select the fat content of the "fatty core" above 40% by weight, because above this fat content the amount of "free fat" (this is fat which is not included in the powder particles) will greatly increase, as a result of which the powder in the dryer will become sticky and drying is made difficult.

The described powdery milk product which is enriched with organic acids and obtained by mixing the "fatty core" with the other milk components, acids and any other components, does, to be sure, dissolve well in cold water or a cold aqueous product, but fat is separated from such a solution, which fat will float on the top of the solution. The milk does not therefore remain homogeneous and is not stable.

The terms "milk liquid" and "milk components" respectively, above and below include both low fat milk and whey and products derived from these two starting materials. The liquid in which the fat phase is emulsified is usually concentrated, but this is not necessary.

It has now been found that a dry, powdery milk product that is enriched with organic acids and is soluble in cold water or in a cold aqueous product, there still being no fat separated from the resultant solution after a few days, can be prepared by homogenizing one or a number of fats in the milk liquid, drying the resultant liquid mixture to a so-called "fatty-core" and mixing this "fatty-core" further with dry powdery "milk components," acids and perhaps other components to form an end product, at least 25% of the protein in this end product being derived from whey or from products derived from whey, the fat content of the end product being up to 17.5% and the end product containing at least 0.05% of added lecithin.

A simple way of adding the desired amount of lecithin is by means of fat in which lecithin is dissolved before this fat is homogenized in (part of) the milk liquid. A practical objection to this manner of adding is, however, that the amount of free fat is greatly increased by the addition of lecithin, if the powder contains more than about 32% of fat at the most in this process, as compared with 40%, if no lecithin is added. Consequently, the amount of material to be homogenized and dried is greater, which means that the end product can be prepared less economically.

It has further been found that the desired effect can also be achieved by adding the lecithin in the form of a dry, concentrated, powdery composition when mixing the end product in a dry state. In this case, the "fatty core" contains no lecithin and can contain the maximum fat content of 40%. Although the lecithin in this process in the acidic, whey powder, which is finally obtained, is not homogeneously mixed with the fat, the lecithin can still sufficiently exert its influence on counteracting the floating of the fat on the surface after the solution of the powder in cold water or a cold aqueous product. The amount of lecithin can range from about 0.05% to about 5%, based on the final product.

The invention is also directed to a process for preparing a liquid milk product by dissolving a dry, powdery milk product according to the invention, which product is enriched with organic acids, in cold water or a cold aqueous product, and is directed further to the feeding of mammals with a liquid milk product that has been obtained in this way.

The saturated or unsaturated carboxylic and/or hydroxycarboxylic acids and/or the salts thereof, up to 10% by weight of which are incorporated into the dry milk product of the invention, are the same as those which are used in the process of the above-mentioned Dutch patent application No. 7,806,635. Generally at least 0.1% by weight of acid is used. Examples of these are: formic acid, lactic acid, acetic acid, butyric acid, citric acid, fumaric acid, sorbic acid, propionic acid, adipinic acid, malic acid and mixtures or salts thereof. The disclosure of said Dutch application is relied on in this regard.

Carbohydrates, if dissoluble in the cold, such as glucose, lactose, galactose or starch hydrolysates can also be incorporated in the dry milk product according to the invention. Starch can also be used, inasmuch as this is necessary for denaturation. Small amounts of emulsifying agent can also be incorporated via the fat phase in order to counteract foaming.

If desired, other components can also be incorporated into the dry milk product of the invention, such as antioxidants, vitamins, minerals, fragrances and flavoring substances, non-acid responsive preservatives, antibiotics, amino acids and other food-stuffs.

Examples of suitable whey products are: whey, delactosed whey, whey permeate or delactosed whey permeate and whey protein obtained after ultrafiltration.

The dry, concentrated, powdery lecithin composition, which may be used, can be prepared on the basis of skimmed milk or whey liquids or liquids derived therefrom, liquids rich in lactose or mixtures thereof.

The liquid milk product of the invention has, in general, a pH of between 4.0 and 6.5, preferably between 5 and 6.

EXAMPLE 1

187 kg. of melted fat was added to a mixture of 94 kg. of concentrated whey, 29% by weight of dry substances (ds), 666 kg. of concentrated skimmed milk (39% by weight of ds) and 106 kg. of concentrated whey having a low milk sugar content (50% by weight of ds). The added fat consisted of 62 kg. of beef tallow (suet), 62 kg. of lard, 52 kg. of palm kernel fat, 1 kg. of glycerin monostearate and 10 kg. of soja oil lecithin (20% by weight of lecithin).

This mixture was first pasteurized and homogenized (76 kg/cm$^2$) at 72° C. and then dried in a drying tower having an inlet temperature of 220° C. and an outlet temperature of 98° C. In this way, a powder containing 35% by weight of fat was obtained. These spray drying conditions are known in the art and conventional procedures may be employed.

32% by weight of this cooled powder was mixed with 39% by weight of delactosed whey powder, 25% by weight of whey powder, 0.5% by weight of lecithin powder (containing 30% by weight of homogenized lecithin and 70% by weight of skimmed milk-ds), 0.5% by weight of gelatinized starch, 1.4% by weight of fumaric acid, 1.2% by weight of sodium propionate and 0.4% by weight of vitamins and minerals.

The resultant end product had the following composition:
- 11.4% by weight of homogenized fats
- 0.15% by weight of homogenized lecithin (added as powder)
- 16.15% by weight of skimmed milk dry substance
- 42% by weight of delactosed whey dry substances
- 26.8% by weight of whey dry substances
- 0.4% by weight of vitamins and minerals
- 0.5% by weight of gelatinized starch
- 1.4% by weight of fumaric acid
- 1.2% by weight of sodium propionate.

By dissolving this end product in cold tap-water a solution was obtained which was stable for a number of days.

EXAMPLE 2

1495 kg. of melted fat was added to a mixture of 752 kg. of concentrated whey (29% by weight of ds) and 6420 kg. of concentrated skimmed milk (39% by weight of ds). The added fat was a mixture of equal parts of beef tallow and lard.

This resultant mixture was first pasteurized and homogenized (76 kg/cm$^2$) at 72° C. and then dried in a drying tower having an inlet temperature of 220° C. and an outlet temperature of 98° C.

Then, 40% by weight of the cooled mixture (with 35% fat by weight in the dry substance) was mixed with 9% by weight of skimmed milk powder, 6% by weight of whey powder, 30% by weight of delactosed whey powder, 3% by weight of lecithin powder (containing 20% by weight of homogenized lecithin and 80% by weight of whey dry substances), 2% by weight of glucose, 1% by weight of lactose, 0.6% by weight of gelatinized starch, 0.5% by weight of a vitamin and mineral pre-mixture, 2% by weight of citric acid, 2% by weight of sodium citrate, 2.5% by weight of sodium propionate and 1.5% by weight of sodium acetate.

The resultant end product had the following composition:
- 14% by weight of homogenized fats
- 0.6% by weight of homogenized lecithin, added as powder
- 10.4% by weight of dry substances
- 33% by weight of skimmed milk dry substances
- 30% by weight of delactosed whey dry substances
- 2% by weight of glucose
- 1% by weight of lactose
- 0.5% by weight of gelatinized starch
- 0.5% by weight of vitamins and minerals
- 2% by weight of citric acid
- 2% by weight of sodium citrate
- 2.5% by weight of sodium propionate
- 1.5% by weight of sodium acetate.

By dissolving this end product in cold tap water a solution which was stable for a number of days was also obtained.

EXAMPLE 3

(feed test)

Black and white calves were first kept in individual boxes for 10 days and then kept in groups of from 4 to 5 animals. These calves had a weight of 39 kg. at birth. After feeding colostrum (beestings), the solution obtained by dissolving the mixture obtained according to example 1 with the aid of a mixer in unwarmed tap water (7 parts by weight of water for every part by weight of mixture) was used. The liquid milk product of the invention was administered at will for a period of 7 days by means of buckets provided with teats (the height of the teats was 60 cm). Each time the milk was prepared for a period of 2 days and each day, or every other day, the milk made available for the calves was added to. It was observed that each calf absorbed an average of 4.9 liters of milk in this period.

Then, the liquid milk product of the invention was administered by means of a calves bar until the calves had gained a weight of 66.5 kg. The milk was continually prepared for 2 days and at weekend for 3 days. The animals initially consumed 6½ liters a day, then 7 liters a day via the cold feeding system (the calves bar). Additionally, the milk-feed was topped up with much fresh water and hay, as well as concentrates for calves.

Measurements showed that when weaning from the milk was begun abruptly (at 66.5 kg. body weight), the calves absorbed 600 g. of concentrates for calves and 3.4 liters of water a day, in addition to the milk.

The week following weaning, 1100 g of concentrates were absorbed each day by the calves, as well as 6.5 liters of water. In the week following, 2.3 kg. of concentrates and 8 liters of water were absorbed.

The resultant growth values were:

| | |
|---|---|
| 0 days-weaning (66.5 kg.) | 620 g/day |
| weaning until 2½ weeks after weaning | 700 g/day |

EXAMPLE 4

1280 kg. of a melted fat mixture consisting of 1150 kg. of lard and 130 kg. of soya lecithin were added to a mixture of 752 kg. of concentrated whey (29% by weight of dry substance), 5330 kg. of concentrated skimmed milk (39% by weight of dry substance) and 1278 kg. of skimmed whey which contained little lactose (mother liquor from lactose preparation with 50% by weight of dry substance).

The resultant mixture was pasteurized at 72° C. and homogenized at a pressure of 76 kg/cm$^2$ and then dried in a spray drier having an air inlet temperature of 220° C. and an outlet temperature of 98° C.

Then 40% of the resultant powder (with 30% of fat in the dry substance) was mixed with 9% by weight of skimmed milk powder, 13% by weight of whey powder, 30% by weight of whey powder which contained little lactose, 3% by weight of lactose, 0.5% by weight of gelatinized starch, 0.5% by weight of a mixture of vitamins and minerals, 2% by weight of citric acid and 2% by weight of sodium propionate.

The resultant end product had the following composition:
- 10.8% by weight of homogenized fat
- 1.2% by weight of lecithin (dissolved in fat)
- 15% by weight of whey dry substance
- 29% by weight of skimmed milk-dry substances
- 36% by weight of whey dry substances containing little lactose
- 3% by weight of lactose
- 0.5% by weight of gelatinized starch
- 0.5% by weight of added vitamins and minerals
- 2% by weight of citric acid and
- 2% by weight of sodium propionate.

When this end product, was dissolved in cold tap water, a solution was obtained which was stable for a number of days.

Further variations and modifications of the invention will be apparent from the foregoing, as will be evident to persons having ordinary skill in the art, and are intended to be encompassed by the claims appended hereto.

I claim:

1. In a process for preparing a dry, powdery milk product comprising at least one whey product, homogenized fat, from 0.1 to 10% by weight of at least one saturated or unsaturated mono-, di-, or tri-carboxylic acid and/or hydroxycarboxylic acid having up to 6 carbon atoms, salts thereof or mixtures thereof by homogenizing one or a number of fats in a milk liquid, drying the resultant liquid mixture and mixing the resultant dried mixture with the acids and/or salts to form an end product, the improvement wherein:
   a. said whey product is selected from the group consisting of whey, delactosed whey, whey permeate, delactosed whey permeate and whey protein obtained after ultrafiltration;
   b. said milk liquid contains all or a portion of said whey product or a mixture thereof with low fat milk or products derived from said two starting materials;
   c. said resultant liquid mixture with said fat homogenized therein is dried to provide an intermediate dry product (fatty core) containing up to 40% by weight of fat; and
   d. said intermediate dry product is mixed with said acid, salt or mixture thereof, with any remainder of said whey product or mixture thereof with low fat milk or products derived from said two starting materials in dry powdery form and with at least 0.05% by weight of lecithin in the form of a dry, concentrated powdery composition to obtain said dry powdery milk product, at least 25% and up to 100% of the protein in said dry powdery milk product being derived from said whey product, the fat content being derived from said intermediate dry product and ranging up to 17.5% by weight of said dry powdery milk product, and said dry powdery milk product, when dissolved into cold water or a cold aqueous product, having a pH in the range of 4.0 to 6.0 and being useful for feeding calves, lambs and goats.

2. A process for preparing a liquid milk product which comprises selecting a dry, powdery milk product as obtained according to the process of claim 1, and dissolving it in cold water or into a cold aqueous product.

3. The process according to claim 1 wherein said intermediate dry product contains from 30% to 40% by weight fat.

4. A dry, powdered milk product for feeding calves, lambs and goats comprising at least one whey product, at least 25% of the protein in said powdered milk product being derived from whey or products derived from whey, a homogenized fat content of up to 17.5% derived from an intermediate product obtained by homogenizing one or a number of fats in a milk liquid containing a whey product selected from the group consisting of whey, delactosed whey, whey permeate, delactosed whey permeate and whey protein obtained after ultrafiltration or a mixture of said whey product with low fat milk or products derived from said two starting materials, at least 0.05% by weight of lecithin in the form of a dry, concentrated powdery composition, and from 0.1 to 10% by weight of a mono-, di-, or tri-carboxylic acid or hydroxycarboxylic acid, salt thereof or mixture thereof, said dry, powdered milk product, when dissolved into cold water or a cold aqueous product, having a pH in the range of 4.0 to 6.0.

5. A liquid milk product comprising water and the product of claim 4.

6. The liquid milk product as defined in claim 5 which has a pH in the range of 5.0 to 6.0.

* * * * *